(12) United States Patent
Koo (10) Patent No.: US 6,704,194 B2
(45) Date of Patent: Mar. 9, 2004

(54) CONTROL OF LCD DISPLAY BACKLIGHT BY ACTUATION OF A LATCH IN A NOTEBOOK COMPUTER

(75) Inventor: Ja-Goun Koo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 87 days.

(21) Appl. No.: 10/015,666

(22) Filed: Dec. 17, 2001

(65) Prior Publication Data

US 2003/0011972 A1 Jan. 16, 2003

(30) Foreign Application Priority Data

Jul. 13, 2001 (KR) ........................................ 2001-42323

(51) Int. Cl.[7] ................................................. G06F 1/16
(52) U.S. Cl. ........................ 361/683; 361/726; 713/20; 341/22
(58) Field of Search ................................ 361/680, 681, 361/683, 78–94, 112; 307/116, 43, 71, 80, 83–86; 713/300, 310, 320–324, 330, 340; 200/61, 761.81, 61.74, 61.76; 327/141, 142, 101; 700/280, 292, 293, 489, 682; 340/625, 673; 341/22; 345/168, 169; 439/188

(56) References Cited

U.S. PATENT DOCUMENTS

| | | | | |
|---|---|---|---|---|
| 5,077,551 A | * | 12/1991 | Saitou | ........................ 345/207 |
| 5,872,515 A | | 2/1999 | Ha et al. | |
| 6,005,497 A | * | 12/1999 | Snyder | ........................ 341/22 |
| 6,044,473 A | * | 3/2000 | Kim | ........................... 713/320 |
| 6,122,152 A | * | 9/2000 | Goto et al. | ..................... 361/1 |
| 6,130,813 A | * | 10/2000 | Kates et al. | ................ 361/93.1 |
| 6,191,503 B1 | * | 2/2001 | Kitten et al. | ................. 307/112 |
| 6,243,819 B1 | * | 6/2001 | Jung | ........................... 713/320 |

FOREIGN PATENT DOCUMENTS

| | | | | |
|---|---|---|---|---|
| JP | 4-332016 | | 11/1992 | |
| JP | 7-333581 | | 12/1995 | |
| JP | 8-36178 | | 2/1996 | |
| JP | 9-269849 | | 10/1997 | |
| JP | 411015559 | * | 1/1999 | ............. G06F/1/16 |
| JP | 02000137549 | * | 5/2000 | ............. G06F/1/26 |
| KR | 1998-060971 | | 11/1998 | |
| KR | 1999-0043128 | | 6/1999 | |

\* cited by examiner

Primary Examiner—Michael Datskovsky
(74) Attorney, Agent, or Firm—Robert E. Bushnell, Esq.

(57) ABSTRACT

A notebook computer with an LCD display monitor, the LCD display monitor having a latch part that serves to both turn "on" or "off" the LCD backlight whenever the LCD display is rotated open or closed on a main body, but also serves as a toggle switch to enable a user to cut power to the LCD display when the LCD display is open. The latch part is spring loaded and can slide to varying positions during use of a notebook computer. If the LCD is open, it slides to a first position where normally, the LCD backlight is "on". When the LCD monitor is closed and locked onto a main body for the notebook computer, the latch part assumes a second position where the backlight is turned off. However, when the LCD is open, if the latch part is slid fully against the spring loaded bias, a toggle switch is activated which enables the user to toggle between "backlight on" and "backlight off" during use of a notebook computer. The structure of the latch part and how these features are accomplished are disclosed herein.

30 Claims, 10 Drawing Sheets

| Pushing Position of latch member 33 | Name of Pushing Position | When Pushing Position occurs | Effect on LCD backlight |
|---|---|---|---|
| "A" | releasing position | LCD 20 is rotated Apart from main body 10 | on or off depending state of toggle switch |
| "B" | hooking position | LCD 20 is closed and Locked onto main body 10 | always off |
| "C" | extension position | can occur anytime upon user actuation | always off + toggles backlight on or off when latch member 33 returns to "A" |
| "D" | between "B" and "C" | occurs during opening and closing of LCD panel + during user actuation of toggle "C" | always off |

CONTROL OF LCD DISPLAY BACKLIGHT BY ACTUATION OF A LATCH IN A NOTEBOOK COMPUTER

CLAIM OF PRIORITY

This application makes reference to, incorporates the same herein, and claims all benefits accruing under 35 U.S.C. §119 from an application for NOTEBOOK COMPUTER earlier filed in the Korean Industrial Property Office on Jul. 13, 2001 and there duly assigned Ser. No. 2001-42323.

BACKGROUND OF THE INVENTION

1. Field of the Invention

The present invention relates in general to a portable computer system, and more particularly, to a portable computer system improved in a structure of an LCD switch controlling power supplied to an LCD back light.

2. Description of the Related Art

Generally, a portable computer system such as a notebook main body is small and light and thus handy to carry, but on the other hand it cannot be used outdoors in the case that electric power is not supplied when a battery is exhausted. Therefore, in order to prolong the duration of a battery, technologies minimizing electric power consumption have been continuously developed by a portable computer system manufacturer. In the portable computer system, electric power consumption is relatively high at an LCD (Liquid Crystal Display) back light which scans an LCD panel so as to display a picture. Therefore, if the electric power consumption required to display a picture at the LCD panel is minimized, the duration of the battery may be effectively prolonged.

However, in these portable computer systems, it is possible to control electric power supplied to an LCD back light only when an LCD assembly is opened and closed. Thus, there is a shortcoming that it is impossible to control electric power supplied to the LCD back light, in the state that the LCD assembly is opened. To make up for the shortcoming, a portable computer system which can be controlled through a keyboard has been developed, but this main body makes another shortcoming that it requires a separate switching control process as software.

Further, in the case that electric power supplied to the LCD back light is controlled through the LCD switch, it requires that a push switch, and a pushing projection or a hook for pushing the push switch should be separately provided at the main body and the LCD assembly, respectively. Therefore, a structure thereof becomes complicated, and the cost of production becomes increased. Moreover, when a design of the main body or the LCD assembly is changed, it requires additional time and efforts because a design of the push switch must be changed together with the pushing projection or the hook.

SUMMARY OF THE INVENTION

It is therefore an object of the present invention to provide an improved power control for an LCD panel in a notebook computer.

It is also an object to provide a simple power control in a notebook computer enabling a user at will to turn on or turn off power delivered to a back light of the LCD panel.

It is further an object to provide power control for a LCD display in a notebook computer that doesn't require extra hardware or software and is inconspicuous.

It is yet another object of the present invention to provide power control of an LCD monitor through a present and previous position of a slidable latch part that is used to lock the LCD display onto the main body containing a keyboard.

It is further an object of the present invention to provide a simple mechanism that allows a user to control power delivery to an LCD when the LCD panel is open, interrupt power automatically when the LCD panel is closed, and to manually lock or fasten the LCD panel to the main body when the LCD panel is closed.

These and other objects of the present invention may be accomplished by the provision of a portable computer system having a main body, and an LCD assembly rotatably combined to the main body and opening and closing onto the main body, and including an LCD panel displaying a picture thereon and an LCD back light transmitting light for displaying the picture on the LCD panel by power supply, the LCD assembly further includes a latch hole provided at one of the main body and the LCD assembly, a latch member installed in the latch accommodating part provided at the other one of the main body and the LCD assembly, and reciprocating from a hooking position at which the latch member is hooked to the latch hole to a releasing position at which the latch member is released from the latch hole, and an LCD switching part installed in the latch accommodating part and controlling electric power supplied to the LCD back light according to the position of the latch member. Preferably, the latch member is movable from the releasing position to a predetermined extension position via the hooking position. Effectively, the LCD switch part cut off the electric power where the latch member is positioned at the hooking position or the extending position.

Preferably, the LCD switch part includes a pushing projection provided at the latch member, and a multistage push switch controlling the electric power by means of the pushing projection where the latch member is positioned at the hooking position or the extension position, and pushed or released where the latch member is positioned at the extension position passing through the hooking position. Effectively, in the latch accommodating part is provided a spring elastically pulling the latch member toward a hooking direction. Preferably, the latch hole is provided at the main body, and the latch accommodating part is provided at the LCD assembly. On the other hand, the latch hole may be provided at the LCD assembly, and the latch accommodating part may be provided at the main body.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
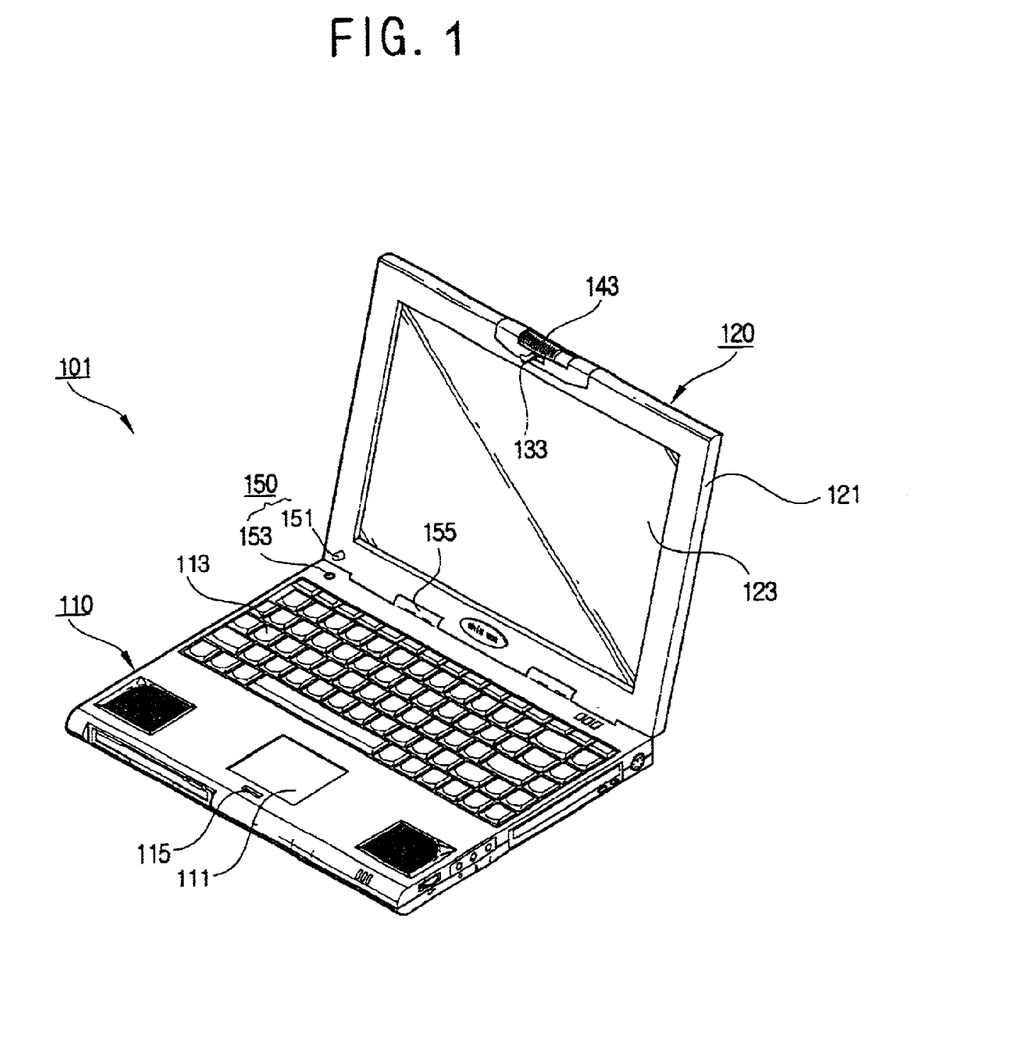
FIG. 1 is a perspective view of a portable computer system.

Turning to the figures, FIG. 1 is a perspective view of a portable computer system. As shown therein, the portable computer system 101 has a main body 110 and a foldaway LCD assembly 120 combined to the main body 110 by means of a hinge 155. Inside the main body 110 are installed a main board, a CPU, a RAM, etc., and on the upper side of the main body 110 are provided a keyboard 113 and a touch pad 111 for an input operation. At the front edge of the upper side of the main body 110 is provided a latch hole 115 corresponding to a latch member 133 (to be described later) of the LCD assembly 120.

The LCD assembly 120 includes an LCD casing 121, an LCD panel 123 accommodated in the LCD casing 121, and an LCD back light (not shown) installed at the rear of the LCD panel 123. At the free end of the LCD assembly 120 are provided the latch member 133 to be hooked and unhooked to the latch hole 115 when the LCD assembly 120 contacts the upper side of the main body 110, and a knob 143 for moving the latch member 133. The LCD panel 123 receives a video signal from the main body 110, and displays it on the front surface thereof. The LCD back light (not shown) transmits a plane light to the LCD panel 123 so as to display a picture on the LCD panel 123.

Further, at the main body 110 and the LCD assembly 120 is provided an LCD switch 150 cutting off electric power supplied to the LCD back light (not shown) when the LCD assembly 120 is closed in the state that the main body 110 is turned on. The LCD switch 150 includes a push switch 153 provided on the upper side of the main body 110 at a position adjacent to the hinge 155 of the LCD casing 121, and a pushing projection 151 provided on the LCD assembly 120 at a position corresponding to the position of the push switch 153.

With this configuration, if a user closes the LCD assembly 120 while using the portable computer system 101, the electric power supplied to the LCD back light (not shown) is cut off according as the pushing projection 151 pushes the push switch 153, thereby turning off the LCD panel 123. Thereafter, if a user opens the LCD assembly 120, the electric power is supplied to the LCD back light (not shown) according as the pushing projection 151 does not push the push switch 153. Thus, if a user closes the LCD assembly 120 while using the portable computer system 101, the LCD panel 123 requiring relatively high electric power consumption is turned off with the main body 110 being turned on, thereby minimizing the electric power consumption of the battery.

Figure 2:
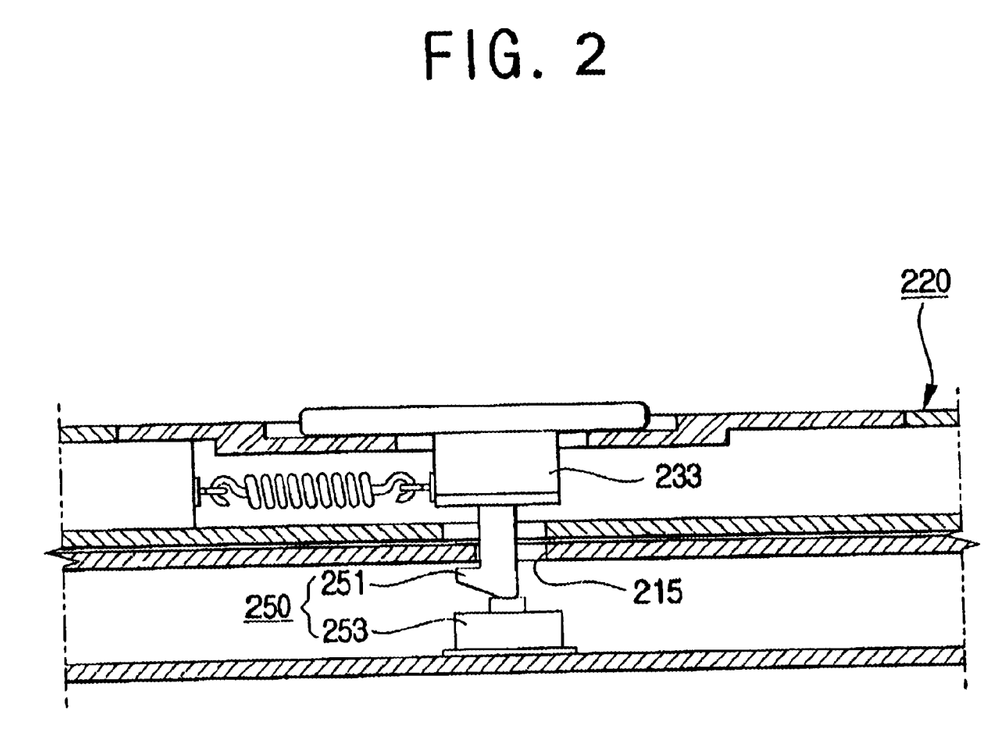
FIG. 2 is a sectional view of a part in which a latch member is installed, in another portable computer system.

FIG. 2 is a sectional view of a part in which a latch member 233 is installed, in another portable computer system. In the portable computer system shown therein, an LCD switch 250 which controls electric power supplied to an LCD back light (not shown) transmitting a light to an LCD panel (not shown) includes a push switch 253 provided inside a latch hole 215, and a hook 251 of a latch member 233 provided at an LCD assembly 220.

With this configuration, if a user closes the LCD assembly 220 while using the portable computer system, the push switch 253 provided inside the latch hole 215 is pushed and electric power supplied to the LCD back light (not shown) is cut off the moment the hook 251 of the latch member 233 is hooked to the latch hole 215, thereby turning off the LCD panel (not shown). Thereafter, if a user opens the LCD assembly 220, the latch member 233 does not push the push switch 253, thereby supplying electric power to the LCD back light (not shown).

Figure 3:
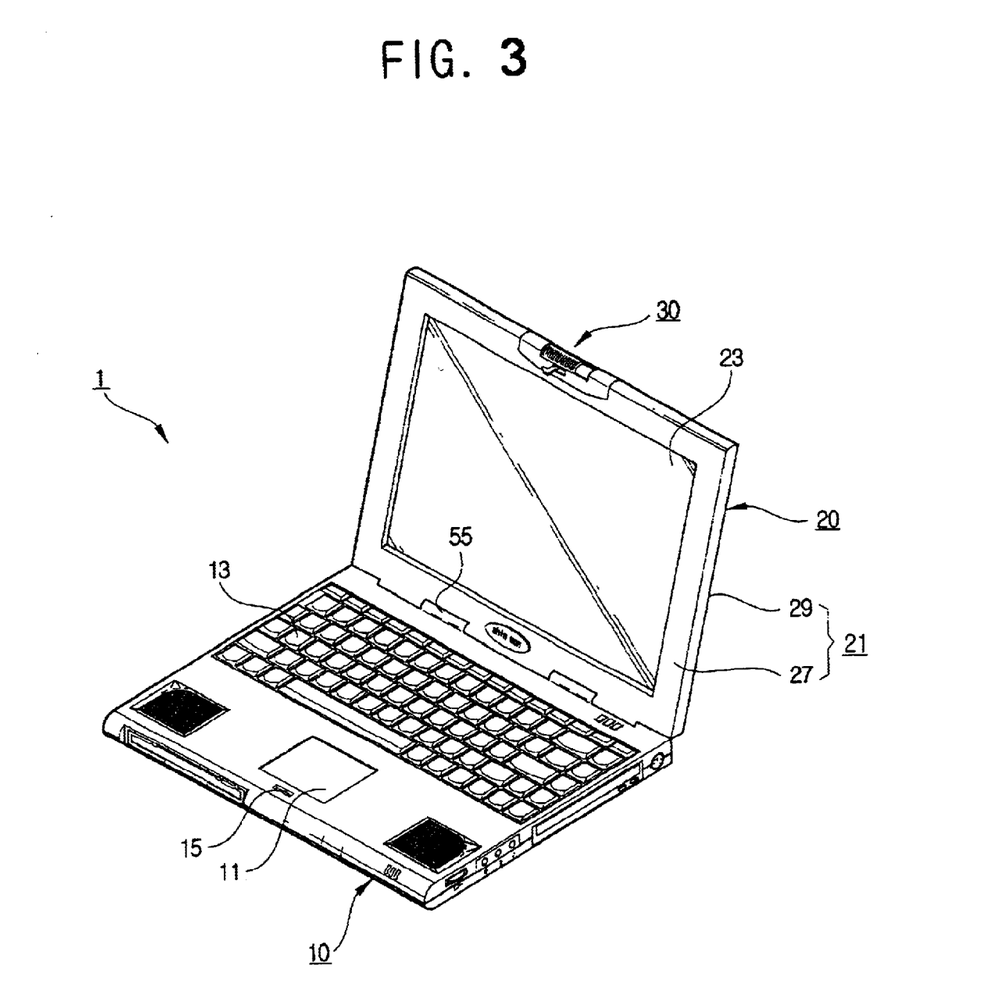
FIG. 3 is a perspective view of a portable computer system according to the first embodiment of the present invention.

FIG. 3 is a perspective view of a portable computer system according to the present invention. As shown therein, the portable computer system 1 comprises a main body 10 and a foldaway LCD assembly 20 combined to the main body 10 by means of a hinge 55. Inside the main body 10 are installed a main board, a CPU, a RAM, etc., and on the upper side of the main body 10 are provided a keyboard 13 and a touch pad 11 for an input operation. At the front edge of the upper side of the main body 10 is provided a latch hole 15 corresponding to a hook 45 of the LCD assembly 20.

The LCD assembly 20 includes an LCD casing 21, an LCD panel 23 accommodated in the LCD casing 21, and an LCD back light (not shown) installed at the rear of the LCD panel 23. The LCD casing 21 is comprised of a front casing 27 and a rear casing 29, which are mutually combined so as to form a space for accommodating the LCD panel 23 and the LCD back light (not shown). The LCD panel 23 receives a video signal from the main body 10, and displays it on the front surface thereof. The LCD back light (not shown) transmits a plane light to the LCD panel 23 so as to display a picture on the LCD panel 23.

Figure 4:
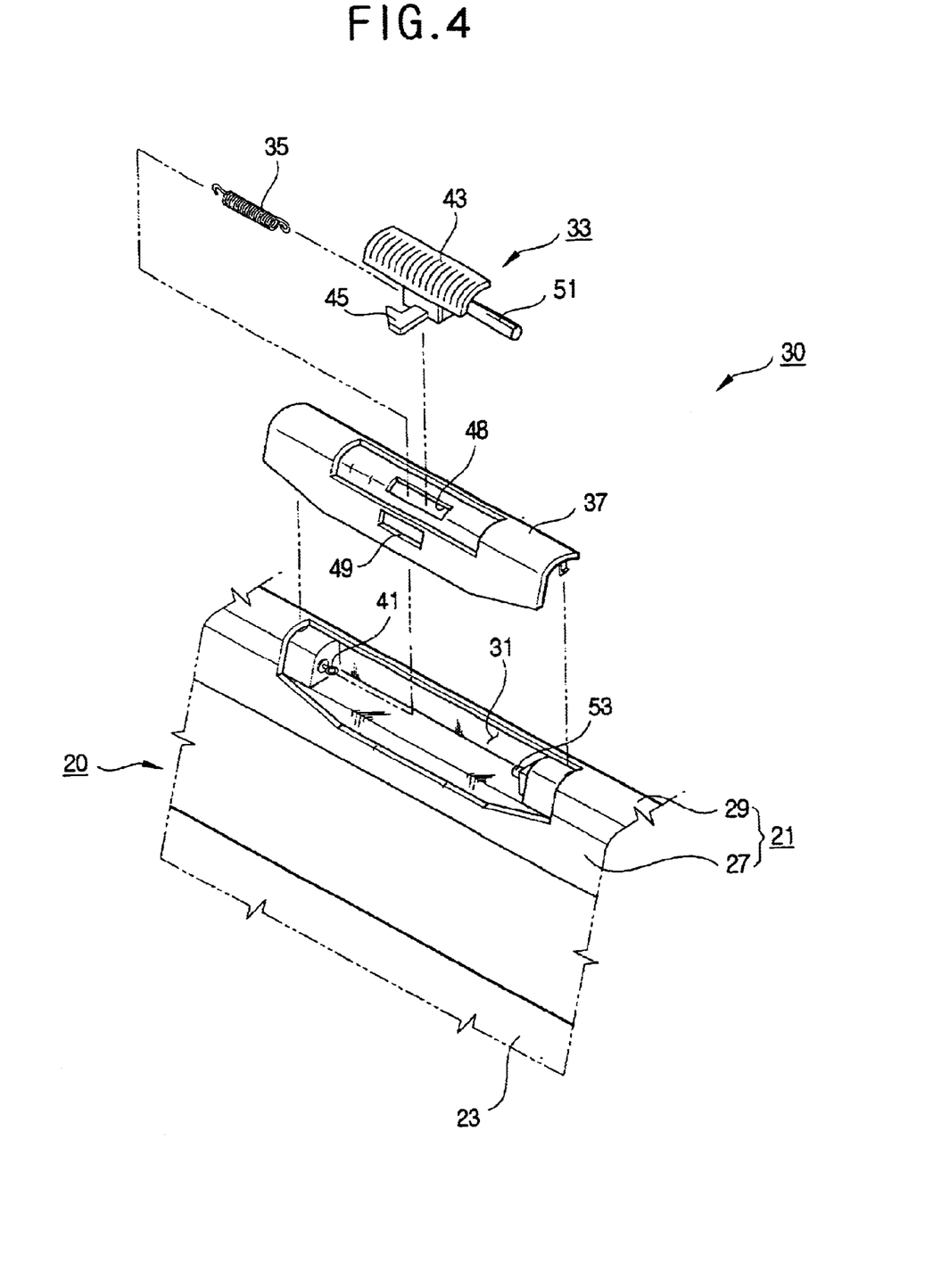
FIG. 4 is a exploded perspective view of a part in which latch and LCD switch parts are installed in the portable computer system of FIG. 3.

As shown in FIG. 4, at the free end of the LCD assembly 20 are provided a latch part 30 to be hooked and unhooked to the latch hole 15 provided at the main body 10 when the LCD assembly 20 is opened and closed, and an LCD switch part 50 (see FIG. 3) controlling electric power supplied to the LCD back light (not shown) transmitting a plane light to the LCD panel 23.

FIG. 4 is an exploded perspective view of a part in which the latch part 30 and the LCD switch part 50 are installed. As shown therein, the latch part 30 includes a latch accommodating part 31 provided at the middle of the free end of the LCD casing 21, a latch member 33 movably accommodated in the latch accommodating part 31 and hooked and unhooked to the latch hole 15 with a reciprocating movement, a spring 35 elastically pulling the latch member 33 toward a hooking direction, and a latch cover 37 covering the latch accommodating part 31. The latch accommodating part 31 is a recess with a predetermined length along the center of the distal edge of the LCD casing 21. At one end of the latch accommodating part 31 is provided a first ring 41 to which one end of the spring 35 is combined. The latch member 33 includes a knob 43 exposed out of the latch cover 37, and a hook 45 attached to knob 43 capable of being hooked and unhooked to the latch hole 15. At one end of the latch member 33 is provided a second ring 47 (see FIG. 5) to which the other end of the spring 35 is combined.

On the latch cover 37 are formed an elongated guiding hole 48 guiding the latch member 33 for the reciprocating movement, and an elongated hook hole 49 through which the hook 45 passes. The guiding hole 48 and the hook hole 49 have such lengths that the latch member 33 can reciprocally move from a releasing position "A" (see FIG. 5), at which the hook 45 is positioned at one end of the latch cover 37, to an extension position "C" (see FIG. 7), at which the hook 45 is positioned at the other end of the latch cover 37, via a hooking position "B" (see FIG. 6), at which the hook 45 is hooked to the latch hole 15 in a middle of a distal portion of main body 10 when the LCD assembly 20 is closed.

While the LCD assembly 20 is opened, the latch member 33 is positioned at the releasing position "A" (see FIG. 5) by a restoring force of the biased spring 35. If a user closes the LCD assembly 20, the hook 45 of the latch member 33 is hooked to the latch hole 15 by the restoring force of the spring 35 at the hooking position "B" (see FIG. 6). Further, the latch member 33 is moved to the extension position "C" (see FIG. 7) accordingly as a user moves the knob 43 to a releasing direction in order to open the LCD assembly 20, and then is restored to the releasing position "A" by the restoring force of the spring 35 accordingly as a user lets go of the knob 43 after the LCD assembly 20 is opened. The LCD switch part 50 is includes a pushing projection 51 attached to latch member 33, and a push switch 53 provided at an opposite end of latch accommodating part 31 opposite first ring 41. The pushing projection 51 is protruded from the latch member 33 with a predetermined length. The pushing projection 51 actuates push switch 53 when the latch member 33 is positioned at the hooking position "B" (see FIG. 6) or the extension position "C" (see FIG. 7) or "D" (see FIG. 6) (see also FIG. 8).

Figure 5:
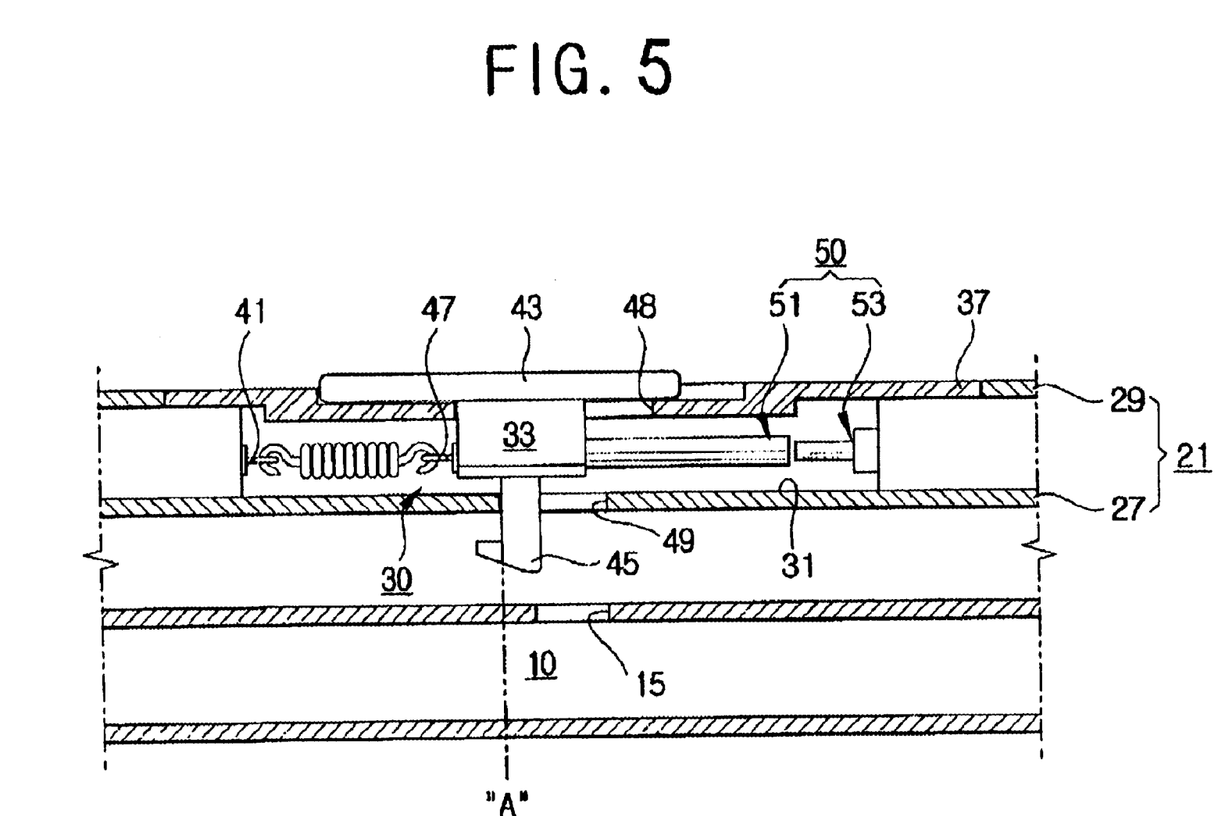
FIGS. 5 through 7 are sectional views of a combination of the latch and LCD switch parts for explaining operations thereof according to the first embodiment of the present invention.
Figure 6:
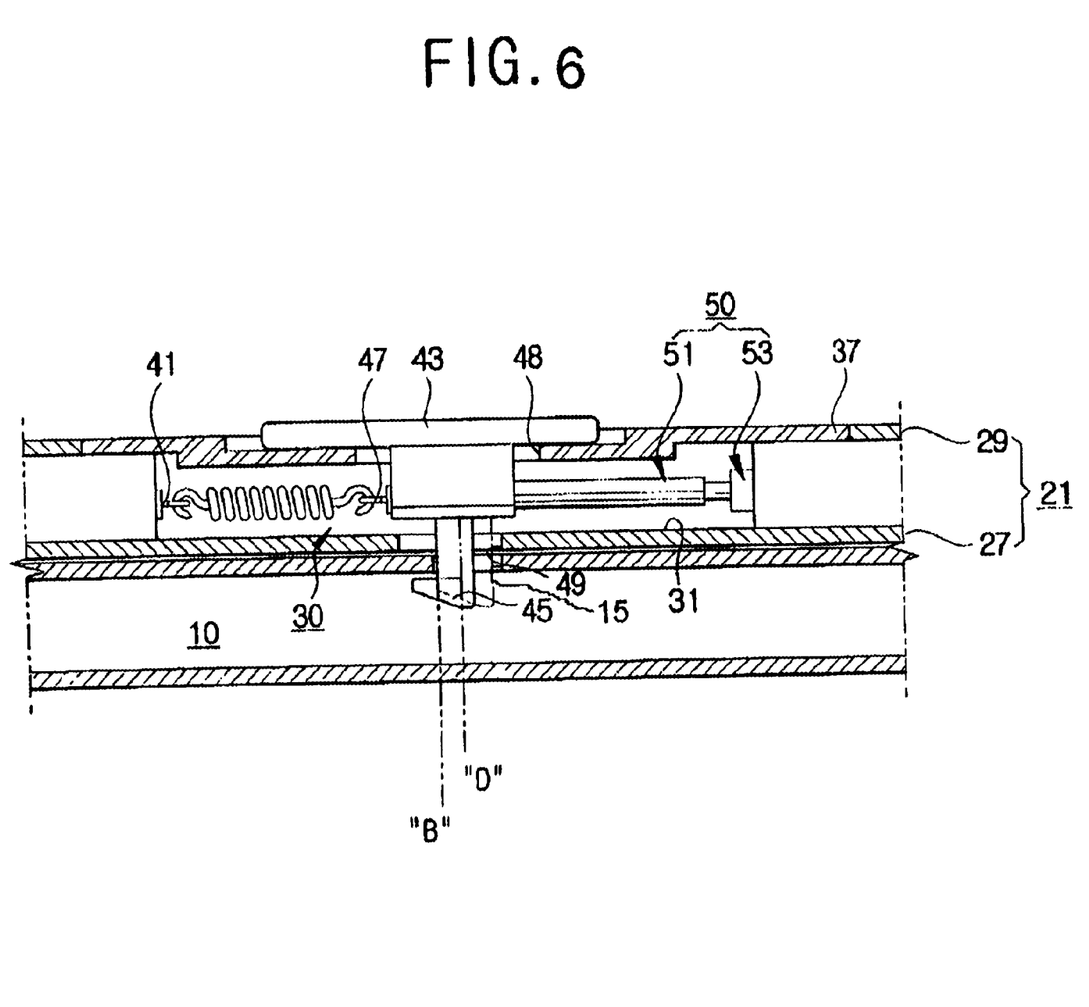
Figure 7:
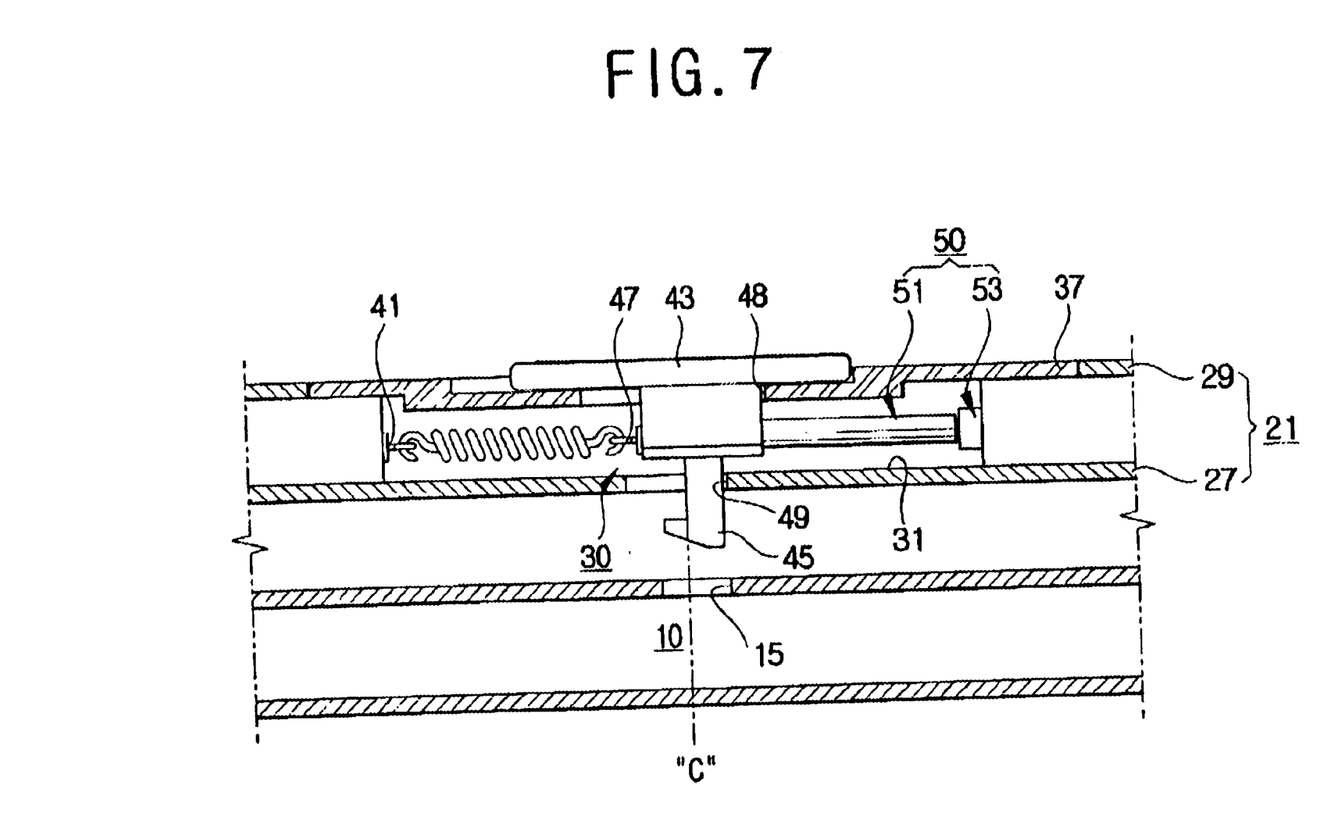
Figure 8:
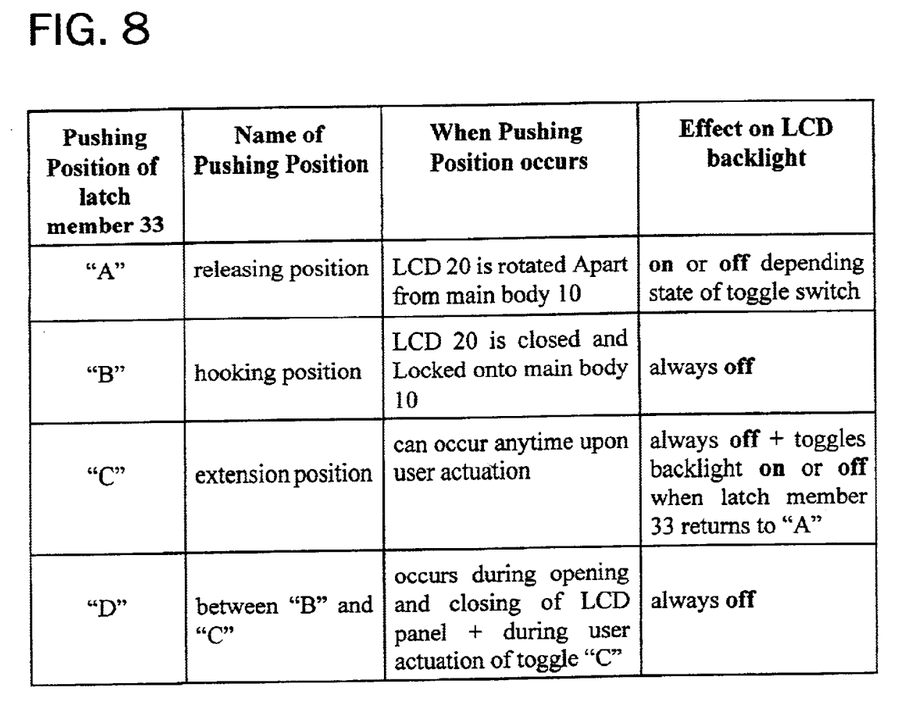
FIG. 8 is a table describing all four states of the latch member and the effect each state has on the backlight of the LCD.

The push switch 53 is comprised of a multistage push switch which can control electric power supplied to the LCD back light (not shown) by stages according to the degree of actuation by the pushing projection 51, i.e., whether the latch member 33 is positioned at releasing position "A" (see FIG. 5), hooking position "B" (see FIG. 6) an extension position "C" (see FIG. 7) or a position "D" between "B" and "C" (see FIGS. 6 and 8). Here, where the latch member 33 is positioned at the extension position "C", the push switch 53 is in a fully pushed state. The pushed push switch 53 is partially released at a predetermined position, including a position "D" (see FIG. 6), namely, between the hooking position "B" and the extension position "C", in order to turn on the LCD panel 23 whenever the LCD assembly 20 is opened.

With this configuration, in the portable computer system 1 according to the present invention, if a user closes the LCD assembly 20 while using the portable computer system 1, as shown in FIG. 6, the pushing projection 51 provided at the latch member 33 pushes the push switch 53 according as the latch member 33 is positioned at the hooking position "B", to thereby cut off electric power supplied to the LCD back light (not shown). Thereafter, if a user opens the LCD assembly 20, as shown in FIG. 5, the pushed push switch 53 is released according as the latch member 33 moves to the releasing position "A", to thereby turn on the LCD panel 23 by supplying electric power to the LCD back light (not shown).

Not only does extension position "C" serve to turn off the backlight of the LCD monitor, extension position "C" serves as a toggle switch to determine whether the backlight of the LCD monitor shall remain "off" or turn "on" when latch member 33 is subsequently moved to releasing position "A". For example, if a user wants to turn off the LCD back light (not shown), with the LCD assembly 20 being opened, a user has only to move the latch member 33 to the extension position "C" (see FIG. 7). Then, the pushing projection 51 entirely pushes the push switch 53, and the electric power supplied to the LCD back light (not shown) is cut off, so that the LCD panel 23 is turned off. At this time, if a user lets go off the knob 43, though the latch member 33 is restored to the releasing position "A" (see FIG. 5) by the restoring force of the spring 35, the push switch 53 remains in the pushed state.

Thereafter, if a user wants to turn on the LCD back light (not shown) so as to allow the LCD panel 23 to display a picture thereon, a user has only to move the latch member 33 to the extension position "C" (see FIG. 7) again. Then, the pushing projection 51 pushes the push switch 53 again, to thereby release the pushed state of the push switch 53. Therefore, electric power is supplied to the LCD back light (not shown) and the LCD panel 23 can display a picture. At this time, if a user lets go off the knob 43, the latch member 33 is restored to the releasing position "A" (see FIG. 5) by the restoring force of the spring 35 and the push switch 53 is released from the pushed state.

As described above, the LCD switch part controlling electric power supplied to the LCD back light is provided in the latch accommodating part, and therefore the LCD back light can be simply turned on and off without a separate switching control process as software, with the LCD assembly being opened.

Further, the LCD switch part, together with the latch member, is installed in the latch accommodating part provided at the main body or the LCD assembly, and therefore there is no need to change the design of one of the main body and the LCD assembly when the design of the other one of them is changed.

In the above description, a latch hole is provided at a main body, and a latch accommodating part accommodating a latch member together with an LCD switch part is provided at an LCD assembly. However, the latch hole and the latch accommodating part may be respectively provided at the LCD assembly and the main body.

Figure 9:
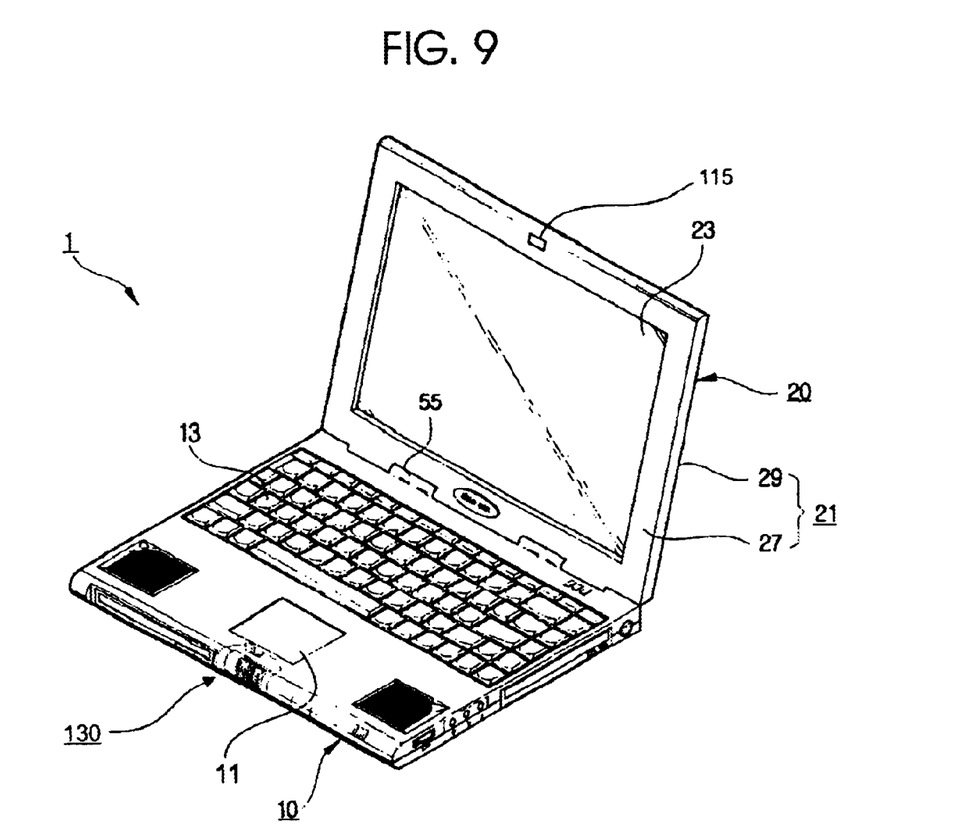
FIG. 9 is a perspective view of a portable computer system according to the second embodiment of the present invention.
Figure 10:
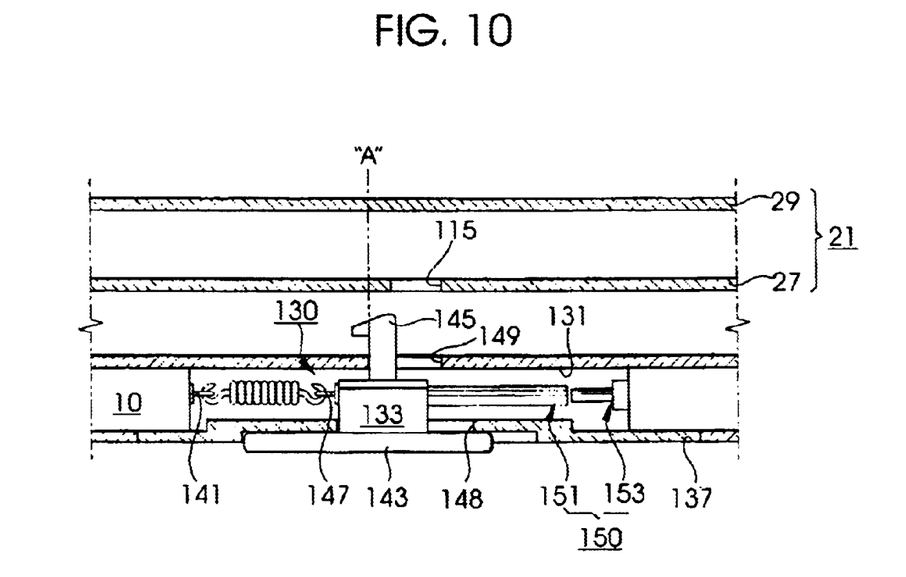
FIG. 10 is a sectional view of a combination of the latch and LCD switch parts for explaining operations thereof according to the second embodiment of the present invention.

FIGS. 9 and 10 illustrate the portable computer system with latch and switch according to the second embodiment of the present invention. As can be seen in FIG. 9, the latch 130 is found in the main body 10 and not in the LCD assembly 20. In addition, the latch hole 115 is in the LCD assembly 20 and not in the main body 10. In other words, in the second embodiment, the latch member, the switch, the knob and the hook are in the main body 10 instead of in the LCD assembly 20.

Turning to FIG. 10, latch member 133, knob 143, hook 145, the spring, the first ring 141, the second ring 147, the LCD switch part 150, the pushing projection 151, the push switch 153 and the elongated guiding hole 148 are disposed in the main body 10 instead of the LCD casing 21. Each of these parts is identical to that of the first embodiment except that the latch and switch are in the main body 10 and not the LCD casing 21. Therefore, reference numerals of the switch and the latch in FIG. 10 are offset by 100 from the first embodiment of FIG. 3. The parts are the same, but their locations have changed from the first embodiment of FIG. 3 to the second embodiment of FIG. 10. Because of the similarity, a full detailed description of operation will be omitted.

As described above, the present invention provides a portable computer system in which electric power supplied to an LCD back light can be controlled by a user as necessary without a separate switching control process as software, with an LCD assembly being opened, and thus the cost of production can be decreased according to the simplified structure.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A portable computer comprising a main body; and an LCD assembly, said main body rotatably attached to said LCD assembly at proximal portions of said main body and said LCD assembly, and including an LCD panel displaying virtual variable images thereon and an LCD back light transmitting light for displaying the images on the LCD panel by power from a power supply, said portable computer further comprising:

a latch hole disposed at a distal portion of one of the main body and the LCD assembly;

a latch member installed in a latch accommodating part provided at a distal portion of the other of said LCD assembly and said main body, said latch hole disposed in operational relationship with said latch member, and reciprocating from a hooking position at which the latch member is hooked to the latch hole to a releasing position at which the latch member is released from the latch hole; and an LCD switching part installed in the latch accommodating part and controlling electric power supplied to the LCD back light according to the position of the latch member.

2. The portable computer of claim 1, the latch member is movable from the releasing position, against a spring bias, to an extension position via user actuation of a knob with a hook attached thereto.

3. The portable computer of claim 2, the LCD switching part cuts off electric power to said LCD back light when the latch member is positioned at said hooking position and said extension position.

4. The portable computer of claim 3, the LCD switching part comprises:

a pushing projection attached to said latch member; and a multistage push switch controlling the electric power based on present and previous positions of said pushing projection.

5. The portable computer of claim 1, the latch accommodating part is provided a spring elastically pulling the latch member toward a hooking position when said LCD assembly is closed on said main body and towards a releasing position when said LCD assembly is rotated open from said main body.

6. The portable computer of claim 1, the latch hole is provided at the main body, and the latch accommodating part is provided at the LCD assembly.

7. The portable computer of claim 1, the latch hole is provided at the LCD assembly, and the latch accommodating part is provided at the main body.

8. The portable computer of claim 5, the latch member and the switching part are located in the same accommodating part of the LCD assembly, which allows an operator to manipulate power to the LCD backlight while the LCD assembly is open and away from the main body.

9. The portable computer of claim 6, the latch member and the switching part are located in the same accommodating part of the LCD assembly, which allows an operator to manipulate power to the LCD backlight while the LCD assembly is open and away from the main body by activating a toggle switch activated by briefly moving said latch member to said extension position.

10. The portable computer of claim 7, the latch member and the switching part are located in the same accommodating part of the LCD assembly, which allows an operator to manipulate power to the LCD backlight while the LCD assembly is open and away from the main body by activating a toggle switch activated by briefly moving said latch member to said extension position.

11. A notebook computer, comprising:

a main body having a keyboard and a latch hole disposed at a center of a distal end of said main body; and an LCD monitor rotatably attached to said main body and having a latch member slidably attached at a center of a distal end of said LCD monitor, said LCD monitor further comprising a toggle switch disposed within said LCD monitor and in operational relationship with said latch member enabling a user to actuate said switch by sliding said latch member while said LCD monitor is rotated away from the main body causing a backlight to an LCD display in said LCD monitor to toggle between power on and power off.

12. The notebook computer of claim 11, said latch member being spring loaded to move to a releasing position when said LCD monitor is rotated apart from said main body, a hooking position when said LCD monitor is locked onto said latch hole in said main body, and an extension position when said latch member is user actuated to move fully against said spring bias.

13. The notebook computer of claim 12, further comprising a multistage push switch in operational relationship with said latch member, said extension position of said latch member serving as a toggle to power on or off said LCD monitor when said LCD monitor is rotated open from said main body and said latch member is in said release position absent user actuation.

14. The notebook computer of claim 13, said LCD monitor being absent of power when said latch member is in said hooking position.

15. A method for controlling delivery of power to an LCD panel in a notebook computer, said method comprising:

sliding a latch member in a first direction to rotatably release said LCD panel from a main body;

rotating said LCD panel away from said main body;

releasing said latch member allowing said latch member to move in a direction opposite to said first direction; and automatically activating a power switch to deliver power to said LCD panel.

16. The method of claim 15, further comprising:

sliding said latch member fully in said first direction while power is being delivered to said LCD panel and said LCD panel being rotatably open from said main body;

releasing said latch member allowing said latch member to move fully in a direction opposite to said first direction; and automatically cutting off power to said LCD panel while said LCD panel is rotated open from said main body.

17. The method of claim 16, further comprising:

sliding said latch member fully in said first direction when power is absent from said LCD panel and said LCD panel being rotatably open from said main body;

releasing said latch member allowing said latch member to move fully in a direction opposite to said first direction; and automatically supplying power to said LCD panel.

18. The method of claim 16, said notebook computer comprising a multistage push switch disposed in operational relationship with said latch member.

19. The method of claim 18, further comprising:

rotating said LCD panel towards said main body;

moving said latch member partially in said first direction enabling a hook on said latch member to engage with an edge of a latch hole, locking said LCD panel to said main body; and releasing said latch member to allow said hook on said latch member to engage said edge of said latch hole, causing said multistage push switch to cut off power delivery to said LCD panel.

20. The notebook computer of claim 11, said latch member being connected to a spring that is biased to pull said latch member away from said switch.

21. The notebook computer of claim 20, said latch member comprising a knob disposed on an exterior of said LCD monitor at said distal end of said LCD monitor enabling a user to slide said knob causing said latch member to slide against said spring bias to actuate said switch causing a backlight to the LCD display in the LCD monitor to either power on or power off.

22. A notebook computer, comprising:

a main body having a top side and a bottom side, said top side having a keyboard, said main body having a latch hole at a distal end of said top side; and an LCD assembly having a top side and a bottom side, said bottom side having an LCD display, a proximal end of said LCD assembly being hingedly attached to a proximal end of said main body enabling said LCD assembly to rotate between a closed position where the LCD display and the keyboard are not visible to an open position where the LCD display and the keyboard are visible, said LCD assembly comprising a LCD housing for said display, said LCD assembly having a slidable latch member and a switch disposed within said LCD housing, said latch member capable of being slid into said switch to actuate said switch, said switch serving to toggle on and off power to a backlight to said LCD display irregardless of whether said LCD assembly is in said open position or said closed position.

23. The notebook computer of claim 22, said latch member comprising a hook that protrudes through a latch hole in a distal portion of a bottom said of said LCD assembly, said hook fitting within said latch hole in said main body when said LCD assembly is rotated to said closed position.

24. The notebook assembly of claim 22, said latch member being spring biased away from said switch, said latch member actuating said switch to toggle on or off a backlight to said LCD display when said latch member is slid fully against said spring bias.

25. The notebook assembly of claim 22, said latch member comprising a knob disposed on a distal end of said LCD assembly, said knob being exterior to said LCD housing, said knob being formed integrally with said latch member, wherein when said LCD assembly is in said open position and when a user slides said knob, said latch member slides towards said switch contacting said switch and causing said switch to be actuated causing a power state of a backlight to said LCD display to toggle between a power on state and a power off state.

26. The notebook assembly of claim 23, said LCD assembly is closed and locked onto said main body by sliding said latch member fully against said spring bias causing said switch to be actuated as said LCD assembly is closed onto said main body.

27. A notebook computer, comprising:

a main body having a keyboard on an exterior of said main body, said main body further comprising an accommodating portion disposed in an interior of said main body at a distal portion of the main body, said accommodating portion having a latch member disposed within, said latch member being slidable, said accommodating portion having a switch that is actuated when said latch member is slid against said switch; and an LCD monitor rotatably attached to said main body wherein a proximal end of the LCD monitor is hingedly attached to a proximal end of the main body, said LCD monitor having a latch hole disposed at a distal portion of the LCD monitor, said switch in said main body serving to toggle on and off power applied to a backlight to an LCD display in the LCD monitor when said latch member is slid towards and touches said switch.

28. The notebook computer of claim 27, said latch member being connected to a spring that biases said latch member away from the switch.

29. The notebook computer of claim 27, said latch member further comprising a hook that protrudes from said interior of said main body to an exterior of said main body, said hook engages with said latch hole in said LCD monitor when said LCD monitor is locked in a closed position over the keyboard of the main body.

30. The notebook computer of claim 27, said latch member further comprising a knob at a distal end of the main body and external to the main body, said knob being formed integral with the latch member, said latch member being slid when said knob is slid.

\* \* \* \* \*